UNITED STATES PATENT OFFICE.

GUSTAVUS CUPPERS, OF NEW YORK, N. Y.

IMPROVEMENT IN MANUFACTURE OF HARD-RUBBER GOODS.

Specification forming part of Letters Patent No. 20,938, dated July 20, 1858.

*To all whom it may concern:*

Be it known that I, GUSTAVUS CUPPERS, of College Point, in Long Island, in the State of New York, have invented a new and Improved Method of Hardening Caoutchouc or India-Rubber and Gutta-Percha; and I do hereby declare that the following is a full, clear, and exact description of my improvements and of the manner of making and compounding and using the same.

Hardened or vulcanized india-rubber and gutta-percha have of late been used for the purpose of manufacturing articles of commerce; but the more general manufacture and introduction of hardened india-rubber and gutta-percha goods have been limited and restricted by the difficulty of making these articles into every desired shape, size, and form. The importance of remedying this evil, which has been felt in almost all the india-rubber manufactories throughout the United States and other countries, induced me to devote long-continued exertions to overcome this difficulty, and, having at last become successful, I am enabled to state the nature of my invention to consist in improvements in the hardening or vulcanizing process of india-rubber and gutta-percha, by which wares, goods, articles, or merchandise may be manufactured into any desired size, shape, form, mold, or cast.

The method of manufacturing hardened india-rubber and gutta-percha goods at present in use is as follows: The prepared soft compound, consisting of india-rubber or gutta-percha combined with sulphur or other ingredients, is put between tin-foil and pressed in brass forms preparatory to subjecting it to the action of heat. With articles that do not exceed in thickness three-sixteenths of an inch this method answers the purpose; but articles of cylindrical form or having curved surfaces which exceed that thickness shrink so much, and thereby become warped on their surface, so as to make them useless without a great amount of extra labor, as stated below. To obviate this result stout tin has been introduced instead of tin-foil; but it is found that, although this method diminishes the shrinkage, it causes cracks, a rough unseemly surface, and a breaking loose from the mold. To make articles thus produced fit for use it was necessary to bestow upon them a great deal of extra labor by filing, rasping, sawing, cutting, and smoothing the same. In consequence of the unsatisfactory character of these results, the manufacture of hardened india-rubber and gutta-percha goods has hitherto been restricted to articles requiring no considerable thickness, or to hollow articles, or to goods in which a perfect surface was not essential, or to high-priced articles; but the great mass of articles for which hard india-rubber and gutta-percha are so eminently fitted—such as handles for knives, forks, canes, whips, sabers, daggers, tools, umbrellas, knobs for doors, windows, shutters and furniture, butt-ends for muskets, rifles, and other fire-arms, balls, clubs, canes, pipes, &c.—have not been manufactured in large quantities because of the defects and costliness of the process above referred to. I have discovered the cause of this to be not in the nature of the composition used, but in a failure to provide for a proper free contraction during the heating process.

To enable others skilled in the art to make and manufacture articles of hardened caoutchouc, india-rubber, and gutta-percha according to my improved method, I will describe the mode of procedure by which I have been enabled to obtain the best results.

In the first place I prepare the india-rubber or gutta-percha for hardening in the usual manner, and place it in the mold made of tin-foil, or in cast-tin, or cast-brass, or pressed tin, or any other material which molds are made of. I then subject the same to the action of steam or hot air or heat of any kind during a period of from one-half an hour to three hours. The length of time will depend upon the proportion of sulphur mixed with the india-rubber. I then remove it from the heat, and I also remove the mold from the india-rubber or gutta-percha, which by this time is in a half-hardened state. I then put the india-rubber or gutta-percha in a box, seal the said box hermetically, and replace the box containing the india-rubber or gutta-percha into the heat, leaving it there until completely hardened—say about six or eight hours. When the box is removed and opened, the process is completed. The form of the india-rubber or gutta-percha will then be found to be perfect, although somewhat smaller than the mass originally contained in the mold, the great contraction taking place during the last part of the heating process, and not being restrained by the mold at that time, it proceeds in a uniform manner.

The nature of my invention therefore consists, mainly, in dividing the heating process in two, three, or more heats, instead of completing the same at one heat.

By a slight variation of the above-described process I am enabled to repair holes, crevices, or other imperfections in the forms of hard rubber. For this purpose I fill up and smooth the said holes, crevices, or other imperfections of form with soft compound, so as to effect a mechanical combination between the soft compound and the hard rubber. I then subject this mechanical combination to the heating process until the soft compound acquires the hardness and consistency of the hard rubber, when a chemical combination between the two substances will have been formed and the imperfections repaired.

It is proper to state that I use the method above described only for the purpose of obtaining plain surfaces or forms with comparatively large ornaments. When, however, the form of the rubber is to be finely and elaborately embellished or ornamented, I vary the above-described method by introducing two molds—one for the main body of the rubber and the other for the impression of the ornaments. I use the plain form for the purpose of attaining therein about one-half or three-quarters of the ultimate degree of hardness. (This first degree of hardness must be such as to enable the india-rubber or gutta-percha to still receive impressions on its surface by moderate pressure.) I then free it from this mold, remove it from the heat, and deposit it in another mold containing the finely-marked ornaments, and consisting of two or more parts. These parts are to be firmly pressed together by the application of screws or otherwise, so as to convey the impression to its contents. The india-rubber or gutta-percha, with this mold, is then again subjected to the action of heat until the hardening process is completed, when the impressions on the rubber will be found clear and distinct.

As the contraction of the india-rubber and gutta-percha during the second part of the heating process amounts to from one-sixtieth ($\frac{1}{60}$) to one-fortieth ($\frac{1}{40}$) part of its original volume, (the difference depending on the proportion of the sulphur or other ingredient contained in the compound and on the time used for completing the heating process,) it is obvious that the ornamental mold must be made so much smaller than the plain mold as to allow for this contraction.

I wish to have it distinctly understood that I do not claim as my invention the "heating" or "curing" process, as it is called, nor the combination of india-rubber and gutta-percha with sulphur, nor any other combination already patented and described; but What I do claim as new, and desire to secure by Letters Patent of the United States, is—

The improvement in the hardening or curing process of caoutchouc or india-rubber and of gutta-percha, by which articles, wares, goods, and merchandise may be manufactured into any desired size, form, or shape, substantially as described.

GUSTAVUS CUPPERS.

Witnesses:
CHARLES WEHLE,
T. WEHLE.